Oct. 4, 1932.  E. H. W. FOOT  1,881,179
CONTINUOUS TRACK FOR VEHICLES
Filed April 11, 1930  2 Sheets-Sheet 1

Inventor
Edward H. W. Foot
by Wilkinson & Mawhinney
Attorneys.

Inventor
Edward H. W. Foot
by Wilkinson & Mawhinney
Attorneys.

Patented Oct. 4, 1932

1,881,179

UNITED STATES PATENT OFFICE

EDWARD HAMMOND WHALLEY FOOT, OF BEACONSFIELD, ENGLAND

CONTINUOUS TRACK FOR VEHICLES

Application filed April 11, 1930, Serial No. 443,479, and in Great Britain November 5, 1929.

This invention relates to endless chain tracks for vehicles of the kind in which the track comprises a plurality of mutually hinged plates.

According to one feature of this invention, the hinge pins of the hinge lugs of the track are hermetically sealed by gland packing chambers formed at both ends of the central lugs, two outside bush caps, housed in outside bush lugs, being pressed into the packing chambers by springs or the equivalent, so that the projecting ends of the hinge pins are completely surrounded, and the entry of grit or moisture is entirely prevented.

The packing chambers may be formed by recessing the ends of the central lugs.

According to a further feature of the invention, the outside lugs of the track are adapted to carry bogie wheels, not shown, on parallel walls, and the ends of these outside lugs and the rails are curved to allow the plates to turn relative to one another.

The invention is illustrated in the annexed drawings, in which:—

Figure 1:
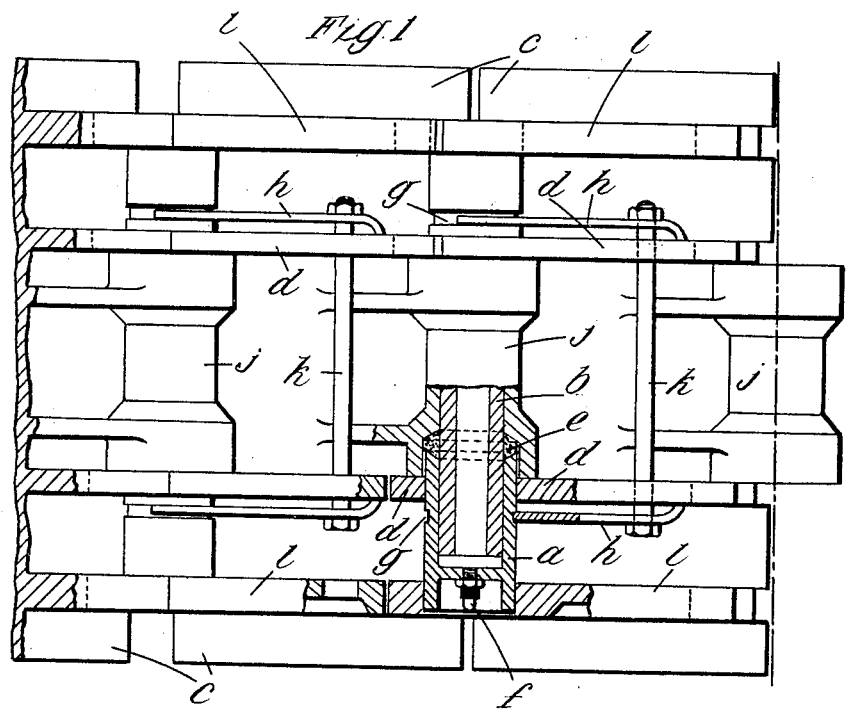
Figure 2:
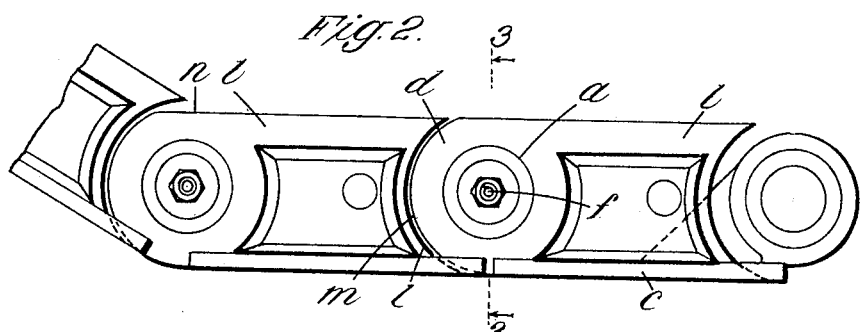
Figure 3:
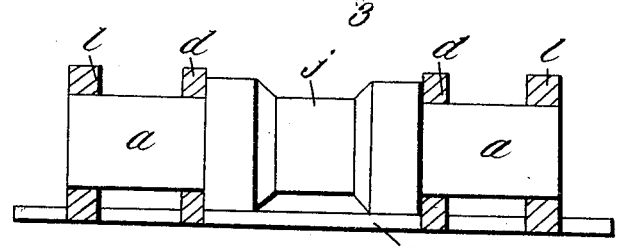
Figure 4:
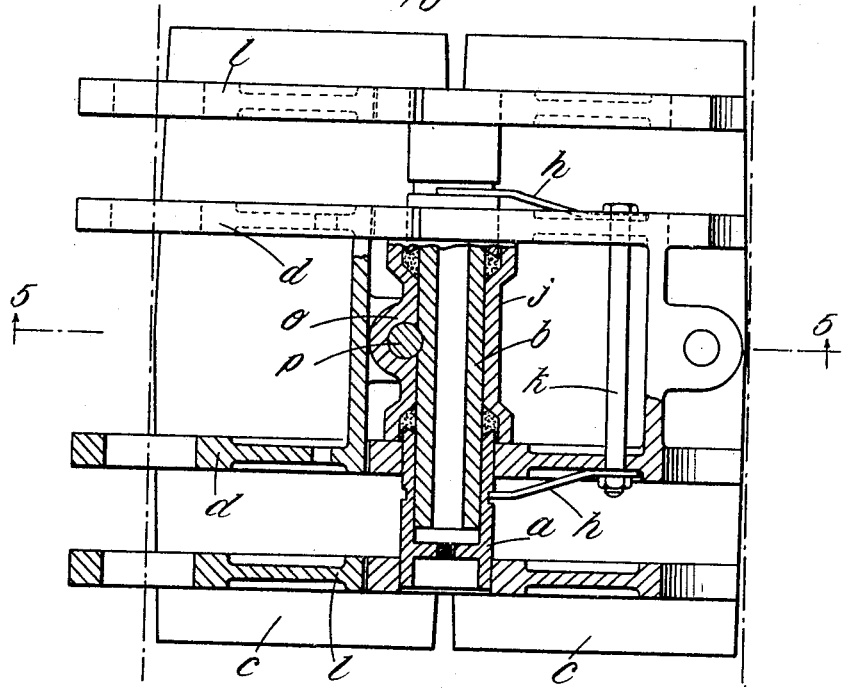
Figure 5:
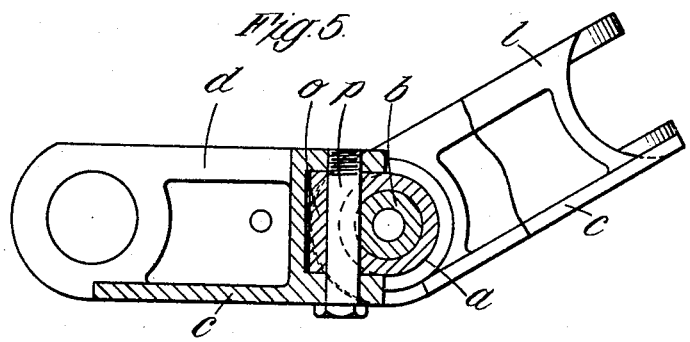

Fig. 1 is a plan, partly in section.
Fig. 2 is a side elevation, and
Fig. 3 is a section on the line 3—3 of Fig. 2 but omitting the pivot pin and showing the caps and lugs in full lines.
Fig. 4 is a plan view, partly in section, of a slightly modified form of construction, and
Fig. 5 is a section on the line 5—5 of Fig. 4 but showing the right hand link partly in full lines.

The hinge pins $b$ are entirely encased in the central lugs $j$ and the end bush caps $a$, which are held in the outside lugs $d$.

This eliminates necessity for carrying the hinge pins to the outer ends of the lugs of the track plates $c$, and so avoids the formation of spaces whereby grit can reach the bearings, and oil is prevented from draining away from them.

In order to seal the bearing, the outer ends of the central lugs $j$ are formed into gland packing chambers for the reception of felt or other packing $e$. The packing chambers may be formed by recessing the ends of the central lugs $j$, as shown in Figure 1.

The hinge pins $b$ may be supplied with lubricant from a grease gun through a nipple $f$.

Each hinge pin may be held stationary with respect to its central lug, as shown in Figure 4, where the lug $o$ is formed as a separate unit and is fixed to its track plate by a bolt or pin $p$. With this construction, the only movement of the hinge pin when the track is in use is the oscillation of the hinge pins in their outer caps, which are lubricated.

To prevent rotation of the bush caps $a$ in their lug chambers, the leaf springs $h$ of Figure 1 are slotted.

To enable the track plates to form rails on which the bogie wheels of a vehicle, not shown, are adapted to run, the webs or side walls $l$ of the track plates are made circular at their ends as shown in Fig. 2, so as to conform to the semi-circular portions $m$ of the projecting parts of the lugs.

To enable the track plates $c$ to turn relative to one another, the ends of the outside lugs and the rails are curved, as shown at $n$.

As shown in Fig. 3 the track plate walls can serve as separate bogie wheel tracks so that staggered bogie wheels can be carried on the track, thus reducing the distance between the points of contact of the bogie wheels and ensuring smooth running, as in Figure 5.

Having now particularly described and ascertained the nature of my said invention and in what manner the same is to be performed, I declare that what I claim is:

An endless chain track comprising a plurality of mutually hinged plates, a central lug having a chamber at each end thereof, packing in said chambers, a hinge pin for said plates having its ends sealed by said chambers and packing, a bush cap for each chamber and springs for pressing and holding the bush caps in place, whereby owing to the spring pressure, the lubricant in the oil chamber at the back of the bush cap is put under pressure as the gland packing gradually wears down and this pressure automatically forces the lubricant to work out, and so prevents any tendency for grit and moisture to work in and destroy the bush and pin.

In testimony whereof I have signed my name to this specification.

EDWARD HAMMOND WHALLEY FOOT.